United States Patent
Ceylan et al.

(10) Patent No.: US 10,417,791 B2
(45) Date of Patent: Sep. 17, 2019

(54) MULTI-STEP TEXTURE PROCESSING WITH FEEDBACK IN TEXTURE UNIT

(71) Applicant: QUALCOMM Incorporated, San Diego, CA (US)

(72) Inventors: Usame Ceylan, Del Mar, CA (US); Vineet Goel, San Diego, CA (US); Juraj Obert, Orlando, FL (US); Liang Li, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/006,502

(22) Filed: Jun. 12, 2018

(65) Prior Publication Data
US 2018/0293761 A1    Oct. 11, 2018

Related U.S. Application Data

(63) Continuation of application No. 15/047,472, filed on Feb. 18, 2016, now abandoned.

(51) Int. Cl.
*G06T 11/00* (2006.01)
*G06T 15/00* (2011.01)

(52) U.S. Cl.
CPC .......... *G06T 11/001* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 6,236,413 B1 | 5/2001 | Gossett et al. | |
| 6,483,505 B1 | 11/2002 | Morein et al. | |
| 6,664,958 B1* | 12/2003 | Leather | G06T 15/40 345/421 |
| 6,690,381 B1 | 2/2004 | Hussain et al. | |
| 6,980,209 B1 | 12/2005 | Donham et al. | |
| 7,307,638 B2 | 12/2007 | Leather et al. | |
| 7,528,843 B1 | 5/2009 | Kilgard et al. | |
| 2007/0279434 A1* | 12/2007 | Fujita | G06T 15/04 345/611 |
| 2008/0301681 A1* | 12/2008 | Sakamoto | G06T 1/20 718/100 |
| 2015/0379676 A1 | 12/2015 | Girado et al. | |
| 2016/0005191 A1* | 1/2016 | Jin | G06T 15/04 345/419 |
| 2017/0243375 A1 | 8/2017 | Ceylan et al. | |

OTHER PUBLICATIONS

International Search Report and Written Opinion—PCT/US2017/012734—ISA/EPO—dated Mar. 20, 2017.

(Continued)

*Primary Examiner* — Nurun N Flora
(74) *Attorney, Agent, or Firm* — Shumaker & Sieffert, P.A.

(57) ABSTRACT

Techniques are described for using a texture unit to perform operations of a shader processor. Some operations of a shader processor are repeatedly executed until a condition is satisfied, and in each execution iteration, the shader processor accesses the texture unit. Techniques are described for the texture unit to perform such operations until the condition is satisfied.

23 Claims, 4 Drawing Sheets

(56) References Cited

OTHER PUBLICATIONS

Owens J., et al., "A Survey of General-Purpose Computation on Graphics Hardware," Feb. 2007, Retrieved from the Internet URL: http://www.researchgate.net/publication/227633811 >, 258 Pages.
Reply to Written Opinion from corresponding PCT Application Serial No. PCT/US2017/012734 filed on Dec. 15, 2017 (18 pages).
Second Written Opinion from corresponding PCT Application Serial No. PCT/US2017/012734 dated Jan. 17, 2018 (7 pages).
International Preliminary Report on Patentability from PCT Application Serial No. PCT/US2017/012734 dated May 2, 2018 (8 pages).

\* cited by examiner

US 10,417,791 B2

MULTI-STEP TEXTURE PROCESSING WITH FEEDBACK IN TEXTURE UNIT

This application is a continuation of U.S. application Ser. No. 15/047,472, filed Feb. 18, 2016, the entire contents of which are incorporated herein by reference.

TECHNICAL FIELD

This disclosure relates to graphics processing systems, and more particularly, to graphics processing systems that utilize a texture unit.

BACKGROUND

Computing devices often utilize a graphics processing unit (GPU) to accelerate the rendering of graphics data for display. Such computing devices may include, e.g., computer workstations, mobile phones such as so-called smartphones, embedded systems, personal computers, tablet computers, and video game consoles. GPUs typically execute a graphics processing pipeline that includes a plurality of processing stages which operate together to execute graphics processing commands. A host central processing unit (CPU) may control the operation of the GPU by issuing one or more graphics processing commands to the GPU.

SUMMARY

This disclosure is directed to using a texture unit to implement operations of a shader processor of a graphics processing unit (GPU) to limit calls to the texture unit. Operations that include multiple calls to the texture unit that a shader processor is to perform are instead performed by the texture unit. Each of these operations that the shader processor is to perform may instead be performed by hardware components within the texture unit. In this way, the GPU leverages the hardware of the texture unit to perform operations that the shader processor is to perform and limits calls to the texture unit.

In one example, the disclosure describes an example method of processing data, the method comprising receiving, with a texture unit, an instruction instructing the texture unit to repeatedly execute operations based on a condition defined in the instruction being satisfied, repeatedly executing, with the texture unit, the operations based on the condition defined in the instruction being satisfied or not being satisfied, and outputting, with the texture unit and to a graphics processing unit (GPU), data resulting from the repeated execution of the operations.

In one example, the disclosure describes an example device for processing data, the device comprising a graphics processing unit (GPU) comprising a shader processor, and a texture unit configured to receive, from the shader processor of the GPU, an instruction instructing the texture unit to repeatedly execute operations based on a condition defined in the instruction being satisfied, repeatedly execute the operations based on the condition defined in the instruction being satisfied or not being satisfied, and output, to the GPU, data resulting from the repeated execution of the operations.

In one example, the disclosure describes an example device for processing data, the device comprising means for receiving an instruction instructing a texture unit to repeatedly execute operations based on a condition defined in the instruction being satisfied, means for repeatedly executing the operations based on the condition defined in the instruction being satisfied or not being satisfied, and means for outputting, to a graphics processing unit (GPU), data resulting from the repeated execution of the operations.

In one example, the disclosure describes an example non-transitory computer-readable storage medium storing instructions that when executed cause one or more processors of a device for processing data to receive an instruction instructing a texture unit to repeatedly execute operations based on a condition defined in the instruction being satisfied, repeatedly execute the operations based on the condition defined in the instruction being satisfied or not being satisfied, and output, to a graphics processing unit (GPU), data resulting from the repeated execution of the operations.

The details of one or more examples of the disclosure are set forth in the accompanying drawings and the description below. Other features, objects, and advantages of the disclosure will be apparent from the description and drawings, and from the claims.

DETAILED DESCRIPTION

This disclosure is directed to leveraging a texture unit to perform operations that otherwise would require a shader processor of a graphics processing unit (GPU) to issue multiple calls to the texture unit to perform the operations. For various graphics processing algorithms, the shader processor outputs multiple requests for the texture unit to retrieve texture data, process texture data, and output the processed texture data (e.g., texels) to the shader processor.

One common factor in the various graphics processing algorithms that repeatedly causes the shader processor to access the texture unit is a structure of the instructions that execute on the shader processor. For example, the structure of the instructions generally includes a loop with a termination condition, logic to advance/modify texture coordinates, and logic to calculate a result of operations defined in the instructions.

In the techniques described in this disclosure, rather than having the shader processor execute these instructions that include the repeated calls to the texture unit, the instructions may be mapped to be performed by hardware components of the texture unit. For example, the texture unit may include a feedback path where an output of the texture unit feeds back into a component of the texture unit that receives the input. With the feedback, the texture unit may be configured to implement the iterations of the loop, without requiring repeated calls to the texture unit from another unit such as a shader processor. In this way, the shader processor may execute one instruction that causes the shader processor to output a set of data (e.g., the data on which the shader processor was going to perform operations) to the texture unit, and the texture unit then performs the iterations of the instructions in the loop using the internal feedback path, and outputs a result once with the final data (texels) to the shader processor. Accordingly, the shader processor may need to output once to the texture unit, rather than output multiple times with intermediate data, and receive data once from the texture unit, rather than having the shader processor access the texture unit multiple times (e.g., rather than receiving intermediate output multiple times from the texture unit and invoking the texture unit with multiple calls).

In some examples, the GPU and texture unit may reside in the same integrated circuit or may reside in different integrated circuits. The texture unit may be configured to receive, from a shader processor of the GPU, an instruction instructing the texture unit to repeatedly execute operations (e.g., looped-instructions) based on an occurrence of a condition defined in the instruction (e.g., the termination condition). In response, the texture unit may repeatedly execute the operations until the condition defined in the instruction is satisfied or not satisfied, and output to the GPU data resulting from the repeated execution of the operations.

Figure 1:
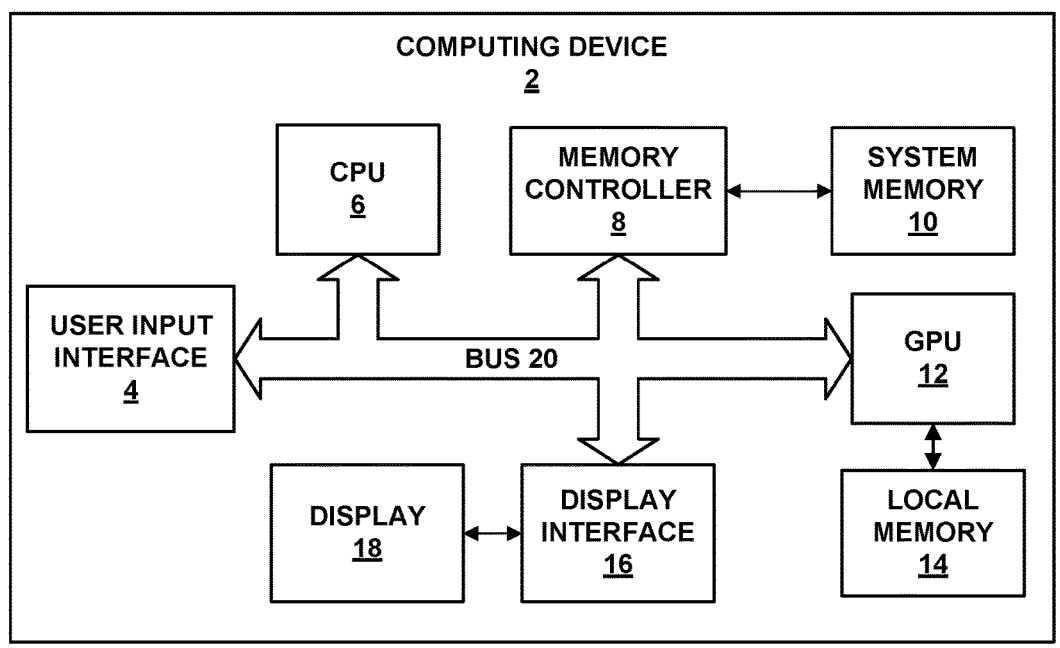
FIG. 1 is a block diagram illustrating an example computing device that may be used to implement the techniques of this disclosure.

FIG. 1 is a block diagram illustrating an example computing device 2 that may be used to implement techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a local memory 14, a display interface 16, a display 18 and bus 20. User input interface 4, CPU 6, memory controller 8, GPU 12 and display interface 16 may communicate with each other using bus 20. Bus 20 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadralaterals, triangle strips, etc.

Memory controller 8 facilitates the transfer of data going into and out of system memory 10. For example, memory controller 8 may receive memory read and write commands, and service such commands with respect to memory 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store user applications and graphics data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. In addition, system memory 10 may store command streams for processing by GPU 12. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics commands may include, e.g., drawing commands such as a draw call, GPU state programming commands, memory transfer commands, general-purpose computing commands, kernel execution commands, etc. In some examples, CPU 6 may provide the commands and graphics data to GPU 12 by writing the commands and graphics data to memory 10, which may be accessed by GPU 12. In some examples, GPU 12 may be further configured to perform general-purpose computing for applications executing on CPU 6.

GPU 12 may, in some instances, be built with a highly-parallel structure that provides more efficient processing of vector operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6. In addition, the highly parallel nature of GPU 12 may allow GPU 12 to process certain types of vector and matrix operations for general-purpose computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 and CPU 6 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to local memory 14. Thus, GPU 12 may read data from and write data to local memory 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize system memory 10 via bus 20. Local memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

CPU 6 and/or GPU 12 may store rendered image data in a frame buffer that is allocated within system memory 10. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computing device 2 via a wired or wireless communications link. For instance, display 18 may be a computer monitor or flat panel display connected to a personal computer via a cable or wireless link.

As described, CPU 6 may offload graphics processing to GPU 12. GPU 12 may in turn perform various graphics processing algorithms to render graphics data. Examples of graphics processing algorithms include parallax occlusion mapping (POM), screen space ray tracing (SSRT), depth of field (DoF) processing, volume rendering, or water or terrain rendering with dynamic height fields. Additional graphics processing algorithms also exist, and the above are merely provided as a few examples.

Part of the graphics processing in example graphics processing algorithms includes texturing. Texturing involves a texture unit that retrieves a bitmap from a texture buffer and overlays the bitmap over graphical objects. In some examples, GPU 12 includes the texture unit; however, the texture unit may be external to GPU 12. In some examples, the texture unit, GPU 12, and CPU 6 may be all part of the same integrated circuit (IC) or microcontroller. In this disclosure, the texture unit is described as being internal to GPU 12.

To perform graphics processing, a shader processor of GPU 12 may execute operations of a shader program. Part of the execution of the operations of the shader program may include repeated access to the texture unit. For example, the graphics processing algorithm implemented by the shader processor may include operations that form the following structure: a loop with an upper bound on the iteration count, a termination condition in the loop, simple logic to advance/modify texture coordinates, and simple logic to calculate the result of the operations.

In performing the operations, for each iteration of the loop, the shader processor may output a request to the texture unit to retrieve data, perform processing on the data, and output the data back to the shader processor. This results in multiple requests to the texture unit, which consumes power, clock cycles, and bandwidth of connection lines with GPU 12 or bandwidth of bus 20 in examples where the texture unit is external to GPU 12.

In the techniques described in this disclosure, operations that are to be executed by the shader processor of GPU 12 are instead executed by the texture unit. For instance, the operations that the shader processor of GPU 12 was to execute include the operations that are to be repeatedly executed until a condition is satisfied (e.g., a loop of operations with an upper bound on the iteration count). The texture unit may instead repeatedly execute these instructions until the condition is satisfied or not satisfied, without the need for repeated requests by the shader processor. For instance, the condition may be to repeat until an upper bound is reached (e.g., repeat as long as A<B). In this case, the texture unit repeatedly executes as long as the condition is satisfied. The condition may be to repeat until the condition is no longer met (e.g., repeat until A≥B). In this case, the texture unit repeatedly executes as long as the condition is not satisfied.

For example, a texture unit (e.g., one within GPU 12 or external to GPU 12) may receive an instruction instructing the texture unit to repeatedly execute operations based on an occurrence of a condition defined in the instruction (e.g., such as reaching the upper bound of an iteration count). The texture unit may repeatedly execute the operations until the condition defined in the instruction is satisfied or not satisfied, and may output data resulting from the repeated execution of the operations.

As an example, the texture unit may read a texel value (e.g., from a texture buffer) during a first iteration of execution of the operations. The texture unit may determine whether the condition is satisfied or not satisfied based on a comparison of the texel value with a variable defined in the instruction, and determine whether a second iteration of execution of the operations is needed based on the determination of whether the condition defined in the instruction is satisfied or not satisfied.

The repeated executing of the operations includes the texture unit outputting an output of the texture unit as a feedback signal to an input of the texture unit based on the determination that the second iteration of execution of the operation is needed. The texture unit may output to the GPU the data resulting from the repeated execution of the operations based on the determination that the second iteration of execution of the operations is not needed.

In this way, the workload of the shader processor may be reduced, as compared to examples where the shader processor has to execute the operations in the loop, because the shader processor may be able to issue one instruction to the texture unit and have the texture unit repeatedly execute the operations. This may also result in less shader code to be stored in an instruction cache of GPU 12 since all of the operations that formed the loop could be represented as a single instruction to the texture unit.

There may be reduction in power usage and increase in processing efficiency as well. Because the shader processor executes fewer operations, the shader processor may consume less power. The processing hardware units of the texture unit (e.g., arithmetic logic units (ALUs)) may be more power efficient as compared to the shader processor, and therefore, by shifting the execution of the operations to the texture unit, there may be an overall reduction in power. The processing hardware units of the texture unit may also provide higher throughput than the shader processor, resulting in faster processing of the operations than in cases where the texture unit repeatedly executes the operations (e.g., the texture unit is not idle waiting on instructions from the shader processor and does not need to waste clock cycles repeatedly outputting to the shader processor).

The size of a general purpose register (GPR) of the shader processor may also be reduced as compared to examples where the shader processor repeatedly executes the operations of the loop until the condition of the loop is satisfied. The GPR is a register that the shader processor uses to temporarily store data resulting from execution of an operation. If the shader processor were to repeatedly execute the operations, the shader processor would store resulting data for each operation in the GPR and require a relatively large GPR to store data resulting from each iteration of execution. With the example techniques described in this disclosure, the texture unit would store any intermediate data resulting from an iteration of execution, allowing the GPR of the shader processor to be used for other purposes or for the size of the GPR to be reduced.

Figure 2:
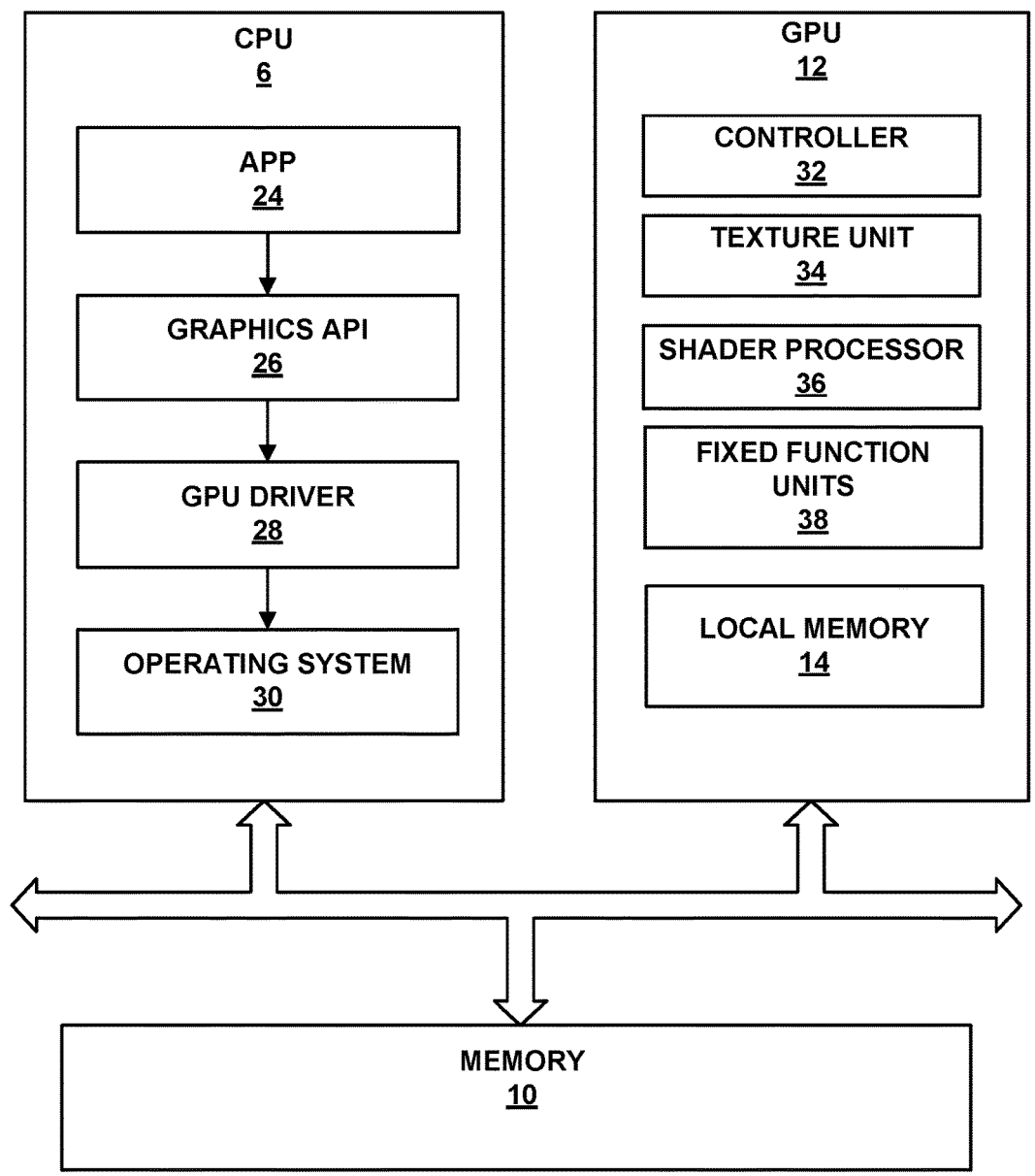
FIG. 2 is a block diagram illustrating the CPU, the GPU and the memory of the computing device of FIG. 1 in further detail.

FIG. 2 is a block diagram illustrating CPU 6, GPU 12 and memory 10 of computing device 2 of FIG. 1 in further detail. As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same integrated circuit or microprocessor as CPU 6 forming a system on a chip (SoC). CPU 6 is configured to execute software application (App) 24, a graphics API 26, a GPU driver 28 and an operating system 30.

GPU 12 includes a controller 32, texture unit 34, shader processor 36, one or more fixed function units 38, and local memory 14. In FIG. 2, local memory 14 and texture unit 34 are illustrated as being internal to GPU 12, but local memory 14 and texture unit 34 may be external to GPU 12 as well.

Software application 24 may each include at least one of one or more instructions that cause graphic content to be displayed or one or more instructions that cause a non-graphics task (e.g., a general-purpose computing task) to be performed on GPU 12. Software application 24 may issue instructions to graphics API 26. Graphics API 26 may be a runtime service that translates the instructions received from software application 24 into a format that is consumable by GPU driver 28.

GPU driver 28 receives the instructions from software application 24 via graphics API 26, and controls the operation of GPU 12 to service the instructions. For example, GPU driver 28 may formulate one or more command streams, place the command streams into memory 10, and instruct GPU 12 to execute command streams. GPU driver 28 may place the command streams into memory 10 and communicate with GPU 12 via operating system 30, e.g., via one or more system calls.

Controller 32 may be hardware of GPU 12, may be software or firmware executing on GPU 12, or a combination of both. Controller 32 may control the operations of the various components of GPU 12. For example, controller 32 may control when instructions and data are provided to the components, control the reception of instructions and data, and control the output of data from GPU 12.

Shader processor 36 and fixed function units 38 together provide graphics processing stages that form a graphics processing pipeline via which GPU 12 performs graphics processing. Shader processor 36 may be configured to provide programmable flexibility. For instance, shader processor 36 may be configured to execute one or more shader programs that are downloaded onto GPU 12 via CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc.

In some examples, shader processor 36 includes a plurality of processing units that are configured to operate in parallel, e.g., as a single instruction multiple data (SIMD) pipeline. Shader processor 36 may have a program memory that stores shader program instructions, a general purpose register (GPR) that stores data that is to be processed and the resulting data, and an execution state register, e.g., a program counter register that indicates the current instruction in the program memory being executed or the next instruction to be fetched. Examples of shader programs that execute on shader processor 36 include, for example, a vertex shader, a pixel shader, a geometry shader, a hull shader, a domain shader, a compute shader, and/or a unified shader.

One or more fixed function units 38 may include hardware that is hard-wired to perform certain functions. Although the fixed function hardware may be configurable, via one or more control signals for example, to perform different functions, the fixed function hardware of one or more fixed function units 38 typically does not include a program memory that is capable of receiving user-compiled programs. In some examples, one or more fixed function units 38 include, for example, processing units that perform raster operations, such as, e.g., depth testing, scissors testing, alpha blending, etc.

GPU 12 also includes texture unit 34, which is a hardware unit of GPU 12 and is used in texturing algorithms. Texturing may include retrieving a bitmap from a texture buffer, which may be part of system memory 10, processing the bitmap, and placing this processed bitmap over a graphical object. The bitmap may be considered as a two-dimensional image that texture unit 34 processes so that shader processor 36 or one or more fixed function units 38 can place over a graphical object. The pixels of the bitmap may be referred to as texels, and the data that texture unit 34 generates for output to shader processor 36 may be referred to as texel data.

As a simple example, the bitmap may be a flattened two-dimensional image of the world map. Texture unit 34 may process this two-dimensional image of the world map and GPU 12 (e.g., via shader processor 36 and/or fixed function units 38) may place this image over a spherical graphical object forming a graphical globe.

Although using texturing to form a graphical globe is one example, there may be various other examples of texturing. Some examples of texturing algorithms include parallax occlusion mapping (POM), screen space ray tracing (SSRT), depth of field (DoF), volume rendering, and water/terrain rendering with dynamic height fields. The examples described in this disclosure are applicable to these texturing algorithms, a subset of these texturing algorithms, texturing algorithms in addition to these examples, or any combination of the foregoing.

To perform texturing, application 24 may issue instructions to graphics API 26, and in turn to GPU driver 28. GPU driver 28 may issue instructions to shader processor 36 to execute operations that include calls to texture unit 34 instructing texture unit 34 to perform processing of data. In some examples, to perform texturing, shader processor 36 may execute a looped function (e.g., such as a "while" loop or a "for" loop) that has a condition to be satisfied (e.g., the loop continues until a bound on the iteration count of the loop is satisfied). During each iteration, shader processor 36 may output the call to texture unit 34 and receive data back from texture unit 34.

As an example, the structure of the looped function may be:

```
initialize
while (condition)
{
  texOffsets
  loopBody
  sample texture
}
```

To further illustrate the looped function, the following is an example of operations that shader processor 36 executes for POM rendering.

```
float height = read_imagef(heightMap, tex).x;
float prevHeight = height;
while (currentLayerHeight > height)
{
  texOffset += dTex;
  prevHeight = height;
  height = read_imagef(heightMap, tex + texOffset).x;
  currentLayerHeight -= layerHeight;
}
```

In the above example, the shader program that shader processor 36 executes causes shader processor 36 to execute an operation via the "read_imagef" function. The "read_imagef" function is used to sample heightmap texture at location tex_texOffset, and the texOffset+=dTex modifies texture coordinates. As can be seen, shader processor 36 repeatedly executes the "read_imagef" function until the condition that currentLayerHeight becomes equal to height is satisfied. During each execution, a texel value is read (e.g., heightmap value) and assigned to a variable (e.g., height). Whether the condition is satisfied is based on a comparison of the texel value with a variable (e.g., height is compared to currentLayerHeight to determine whether currentLayerHeight is greater than height).

To perform the operations for the POM rendering, shader processor 36 may output a request to texture unit 34 (e.g., instruct texture unit 34 to execute the operation of read_imagef) and in return receive texel data for storage in a GPR. Shader processor 36 may perform the additional operations in the above code, and determine whether the condition is satisfied. If the condition is still satisfied, shader processor 36 may repeat the request to texture unit 34 and in turn receive texel data for storage in the GPR, and keep repeating these steps based on whether the condition is satisfied.

In some examples, shader processor 36 may loop through the operations until a condition a satisfied (e.g., loop until an upper bound is reached) or may loop through the operations as long as a condition is satisfied (e.g., as long is a first value is less than a second value). In these examples, shader processor 36 may loop through the operations based on a condition being satisfied (e.g., as long as a condition is satisfied) or not being satisfied (e.g., until a condition is satisfied).

The condition being satisfied may be part of a "while loop," whereas the condition not being satisfied may be part of a "do loop." For instance, the condition may be while A<B perform a set of operations. In this case, texture unit 34 may repeatedly execute the operations based on the condition being satisfied (e.g., if A is less than B, texture unit 34 will execute another iteration of the operations). As another example, the condition may be to repeat until A≥B. In this case, texture unit 34 may repeatedly execute the operations based on the condition not being satisfied (e.g., if A is not equal to or greater than B, texture unit 34 will execute another iteration of the operations). The techniques described in this disclosure are applicable to both cases (e.g., repeatedly executing based on the condition being satisfied and based on the condition not be satisfied, which is a function of how the loop is defined). For ease, the description may refer to the case where texture unit 34 repeatedly executes based on the condition being satisfied, but such description should not be read to mean that the techniques are not applicable to the case where texture unit 34 repeatedly executes based on the condition not being satisfied.

The repeated calls by shader processor 36 to texture unit 34 may increase the workload of shader processor 36, require shader processor 36 to include a relatively large GPR that is unavailable for other purposes while the loop is being executed, as well as use a larger instruction cache in local memory 14 to store all of the operations of the loop. In the techniques described in this disclosure, rather than shader processor 36 repeatedly executing the operations that involve access to texture unit 34, texture unit 34 may be configured to repeatedly execute operations in response to an access from shader processor 36 so that shader processor 36 does not need to repeatedly access texture unit 34.

For example, texture unit 34 may be configured to repeatedly execute a plurality of operations in response to a single access by shader processor 36. At least some of such operations conventionally would be performed in response to each of a plurality of multiple accesses by shader processor 36, e.g., one operation in response to one access. In contrast, in accordance with various examples of this disclosure, texture unit 34 may execute multiple operations in response to a given access to texture unit 34 by shader processor 36.

By reducing the number of accesses to texture unit 34 by shader processor 36 to accomplish a set of operations, the workload of shader processor 36 may be reduced. Furthermore, in some cases, texture unit 34 may be capable of performing condition testing (e.g., condition check), mathematical operations in the loop, and other such functions with higher throughput and utilizing less power than shader processor 36.

For instance, example shader code (e.g., operations of a shader program) of the POM rendering may be one single instruction that shader processor 36 outputs to texture unit 34 (e.g., one instance of shader processor 36 accessing texture unit 34). As an example, the instruction that shader processor 36 may output to texture unit 34 may be:

float4 result=textureLoop(heightMap, tex, dTex, layerHeight, condition . . . );

In the instruction that shader processor 36 outputs to texture unit 34, shader processor 36 includes variables of the operations that texture unit 34 is to perform (e.g., heightMap, tex, dTex, layerHeight) as well as a definition of the condition. In turn, texture unit 34 may repeatedly execute the operations based on the condition defined in the instruction received from shader processor 36 being satisfied.

For texture unit 34 to repeatedly execute the operations, texture unit 34 may need to be configured to recognize that a single function call instructs texture unit 34 to perform a particular set of operations. For instance, during the design of texture unit 34, texture unit 34 may be designed such that if texture unit 34 receives a function having a particular name or receives a function having a particular set of variables or order of variables, then texture unit 34 is to repeatedly execute a particular set of operations. As an example, if texture unit 34 receives an instruction including the textureLoop function, then texture unit 34 may determine that texture unit 34 is to repeatedly execute operations such as those described above as being executed by shader processor 36. If texture unit 34 receives an instruction including a different function (e.g., one for SSRT), then texture unit 34 may determine that texture unit 34 is to repeatedly execute operations that would have otherwise been executed by shader processor 36.

Texture unit 34 may be pre-configured to repeatedly execute operations for different types of texturing, and as more texturing algorithms are developed, texture unit 34 may be configured to repeatedly execute operations for these texturing algorithms as well. More generally, although the examples are described as being for texturing algorithms, the techniques described in this disclosure are not so limited. For instance, the techniques described in this disclosure may be extended to other cases where loop operations are used that require access to texture unit 34, even if the loop operations are not being used for texturing purposes. In this way, texture unit 34 may be configured in a manner that may be more closely comparable to a programmable texture processing unit.

The developer guide for GPU 12 may include information indicating which looped-operations texture unit 34 is configured to perform and the instruction for the function call to have texture unit 34 perform the operations. During development of the shader program used to modify texture coordinates, the developer may include the instruction for the function call rather than looped-operations in the code of the shader program.

As another example, rather than relying on the developer to exploit the ability of texture unit 34 to execute the looped-operations, a compiler, executing on CPU 6, that compiles the shader program may compile the looped-operation into a single instruction that includes the particular function call to texture unit 34. Alternatively or in addition, GPU driver 28 or a wrapper for GPU driver 28 may be configured to read the high-level language of the code of the shader program and determine places in the code that include particular looped-operations that texture unit 34 is configured to execute. GPU driver 28 or the wrapper for GPU driver 28 may modify the code of the shader program to include the single instruction with the particular function call to have texture unit 34 execute the looped-operations.

Accordingly, texture unit 34 may be configured to receive an instruction outputted by shader processor 36 instructing texture unit 34 to repeatedly execute operations based on a condition defined in the instruction being satisfied (or not being satisfied). The operations may be operations of a shader program and include operations to modify texture coordinates.

Texture unit 34 may repeatedly execute the operations based on the condition defined in the instruction being satisfied or not being satisfied (e.g., as long as the condition is satisfied or until the condition is satisfied) and repeatedly execute without receiving any additional instructions to execute the operations from shader processor 36. In this way, the workload of shader processor 36 and the frequency of interaction between shader processor 36 and texture unit 34 may be reduced.

Texture unit 34 may output data resulting from the repeated execution of the operations. For example, texture unit 34 may output the data to shader processor 36 only after all iterations of the repeated execution of the operations are complete. In other words, texture unit 34 may not output the data resulting from the repeated execution until after the loop are complete. Accordingly, the number of times texture unit 34 needs to output to shader processor 36 may also be limited. However, in some examples, texture unit 34 may periodically or at the conclusion of one iteration, output data resulting from the execution to shader processor 36. Therefore, the examples of the output of data resulting from the repeated execution includes the final data after all iterations are complete or periodically during the repeated execution.

Figure 3:
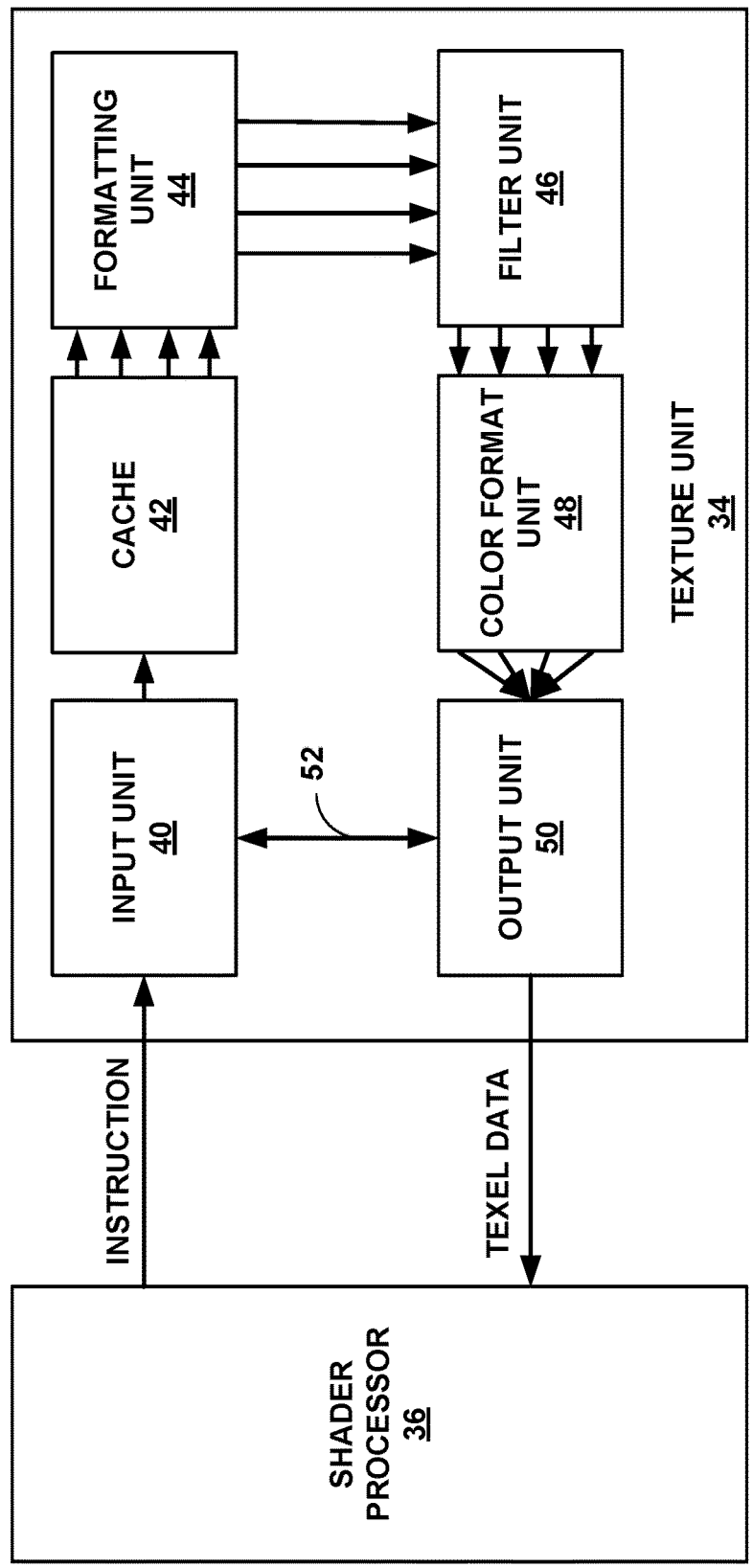
FIG. 3 is a block diagram illustrating an example of a texture unit of FIG. 2 in further detail.

FIG. 3 is a block diagram illustrating an example of a texture unit of FIG. 2 in further detail. In FIG. 3, shader processor 36 may output one instruction to texture unit 34 instructing texture unit 34 to repeatedly execute operations based on a condition defined in the instruction being satisfied or not satisfied. For instance, the instruction that shader processor 36 outputs to texture unit 34 includes the variables on which texture unit 34 operates and the condition that defines when the looped operations are complete.

As illustrated, texture unit 34 includes input unit 40, cache 42 (which may be a local cache of texture unit 34 or part of local memory 14), formatting unit 44, filter unit 46, color format unit 48, and output unit 50. In the example texture unit 34, output unit 50 and input unit 40 are connected to one another via feedback signal 52. As described in more detail, feedback signal 52 provides the mechanism to determine whether the condition is satisfied or not satisfied.

The units of texture unit 34 illustrated in FIG. 3 are illustrated to ease with understanding. Different types of texture unit 34 may include more, fewer, or different units than those illustrated, and the interconnection between the components need not necessarily be as illustrated. The techniques described in this disclosure are also applicable to such examples of texture unit 34.

In normal operation (e.g., where texture unit 34 is not be repurposed to perform operations generally performed by shader processor 36), input unit 40 may be used for addressing purposes. Input unit 40 may convert (u,v) coordinates into memory addresses. Cache 42 may store the information addressed by input unit 40. Formatting unit 44 may perform various formatting on the bitmap as defined by the texturing algorithm. Filter unit 46 may perform bilinear filtering/interpolation. Color format unit 48 may format the color of the bitmap. Output unit 50 receives the output from color format unit 48 and is the output interface to shader processor 36 to output the texel data.

However, in the example techniques described in this disclosure, these various units may be repurposed to repeatedly execution operations of a shader program. For instance, as described above, the structure of the looped-operations may be as follows:

```
initialize
while (condition)
{
  texOffsets
  loopBody
  sample texture
}
```

In some examples, input unit 40 may be configured to perform the initialize and texOffsets operations. Filter unit 46 may be configured to perform the operation of the condition. Color format unit 48 may be configured to perform the operation of the loopBody. Output unit 50 may be configured to determine whether the condition is satisfied.

For example, output unit 50 may be configured to determine whether an iteration of execution of the operations is needed based on whether the condition defined in the instruction is satisfied or not satisfied. In the example of a while-loop, output unit 50 may determine whether the condition to be satisfied is still true. If the condition to be satisfied is still true, output unit 50 may determine that the iteration of execution of the operations is needed (i.e., another pass through the loop). In this case, to repeatedly execute the operations, output unit 50 is configured to output, from texture unit 34 (e.g., output data resulting from one iteration of the loop), feedback signal 52 to input unit 40 based on the determination that the iteration of execution of the operations is needed. If the condition to be satisfied is false, output unit 50 may determine that the iteration of execution of operations is no longer needed (i.e., the loop is complete). In this case, output unit 50 outputs the data resulting from the repeated execution of the operations based on the determination that the iteration of execution of the operations is not needed. In some examples, input unit 40 may be configured to give feedback signal 52 higher priority than any output from shader processor 36.

In some examples, during each iteration of execution of the loop, texture unit 34 may read a texel value. For instance, input unit 40 or formatting unit 44 may be configured to read texel values from a texture buffer (e.g., located in local memory 14 or possible system memory 10) or from cache 42, and may read a texel value during each iteration. Output unit 50 may compare this read texel value (or a processed version of the read texel value) with a variable defined in the instruction to determine whether another round of iteration is needed. In these examples, the read texel value controls whether more iterations of execution are needed based on the comparison to the variable defined in the instruction.

For instance, a read unit (e.g., input unit 40 and/or formatting unit 44, or possibly some other unit of texture unit 34) may read a texel value during a first iteration of execution of the operations. Output unit 50 may determine whether the condition is satisfied based on a comparison of a value based on the texel value (e.g., the texel value itself or a value determined from processing the texel value) with a variable defined in the instruction. Output unit 50 may determine whether a second iteration of execution of the operations is needed based on the determination of whether the condition defined in the instruction is satisfied.

In one example, to repeatedly execute the operations, output unit 50 may output a feedback signal to input unit 40 based on the determination that the second iteration of execution of the operations is needed. In another example, output unit 50 may output the data resulting from the repeated execution of the operations based on the determination that the second iteration of execution of the operations is not needed.

As an illustration, for the POM algorithm above, the condition of the while loop was while (currentLayerHeight>height) and the loopBody was height=read_imagef(heightMap.tex+texOffset). In this example, a read unit (e.g., input unit 40 or formatting unit 44, as two non-limiting examples) may read a texel value (e.g., the value stored at heightMap.tex+texOffset) during a first execution of the operations.

After one iteration of execution of the operations of the while loop, output unit 50 may determine whether currentLayerHeight is still greater than height. For example, output unit 50 may determine whether the condition is satisfied based on a comparison of a value based on the texel value (texel value itself in this case, which the value of height) with a variable defined in the instruction (e.g., currentLayerHeight). Output unit 50 may determine whether a second iteration of the execution of the operations is needed based on the determination of whether the condition defined in the instruction is satisfied.

For example, if true (e.g., currentLayerHeight is still greater than height), output unit 50 may output the value of height as previously calculated back to input unit 40 as feedback signal 52 so that the units of texture unit 34 execute an iteration of the operations. Accordingly, to repeatedly execute the operations, output unit 50 may be configured to output feedback signal 52 to input unit 40 based on the determination that the second iteration of execution of the operations is needed. This process repeats until the condition is no longer true.

If false (e.g., currentLayerHeight is no longer greater than height), output unit 50 may output the final value of height to shader processor 36 as determined via the repeated execution of the operations. Accordingly, output unit 50 may output the data resulting from the repeated execution of the operations based on the determination that the second iteration of execution of the operations is not needed.

In this example, the first iteration and second iteration are used as a way to assist with understanding. There may be multiple iterations, and for each iteration, output unit 50 may output feedback signal 52 to input unit 40 based on a comparison between a value based on the read texel value (e.g., the texel value itself or processed texel value) and a variable defined in the instruction. If another iteration is needed, output unit 50 may output feedback signal 52 to input unit 40, and if another iteration is not needed, output unit 50 may output to GPU 12.

The above provided an example using POM. The following provides some additional example uses including another example of using POM. Furthermore, the above example of POM provided one example of which units of texture unit 34 perform which operations. However, the techniques described in this disclosure are not so limited, and units of texture unit 34 may perform different operations than the example of POM provided above. In some examples, the operations include operations to modify texture coordinates (e.g., texOffset). Also, the techniques described in this disclosure should not considered limited to texturing, and may be used for other purposes such as ray tracing and other examples. In some examples, output unit 50 may periodically output data to shader processor 36 rather than only after completion of all iterations of execution of the operations.

As another example of POM, in the loop structure, the initialize operation is currHeight=1, the condition is (currHeight>height AND currHeight>0), the texOffsets operation is texCoord+=dTex, and the loopBody is currHeight−=layerHeight. In this example, input unit 40 may set currHeight=1 and perform the operation of texCoord+=dTex. Formatting unit 44 may assign a true or false value based on whether the condition of currHeight>height is satisfied. Filter unit 46 may perform the operation of currHeight−=layerHeight.

Output unit 50 may determine whether an iteration of execution of the operations is needed based on whether the condition defined in the instruction is satisfied (e.g., based on the true or false determination made by formatting unit 44). In this example, to repeatedly execute the operations, output unit 50 outputs from texture unit 34 (e.g., data from one iteration of the operations) feedback signal 52 to input unit 40 based on the determination that the iteration of execution of the operations is needed. Otherwise, to output data, output unit 50 outputs the data resulting from the repeated execution of the operations based on the determination that the iteration of execution of operations is not needed. In each case, whether another iteration of the loop is needed may be based on a comparison of the texel value (or a value determined from the texel value) and a variable defined in the instruction.

As an example of screen space ray tracing (SSRT), there may be no initialize operation. The condition is (P.x*stepDir<=endP AND stepCount>maxSteps). The texOffsets operation is (P, Q.z, k)+=(dP, dQ.z, dK). The loopBody operation is rayZmax=(dQ.z*0.5+Q.z)/(dK*0.5+k). Similar to above, in this example, input unit 40 may perform the operation of (P, Q.z, k)+=(dP, dQ.z, dK). Formatting unit 44 may assign a true or false value based on whether the condition of P.x*stepDir<=endP AND stepCount>maxSteps is satisfied. Filter unit 46 may perform the operation of rayZmax=(dQ.z*0.5+Q.z)/(dK*0.5+k).

Output unit 50 may determine whether an iteration of execution of operations is needed based on whether the condition defined in the instructions is satisfied. If true, output unit 50 outputs feedback signal 52 to input unit 40 for another execution iteration. If false, output unit 50 outputs the final data resulting from repeated execution by texture unit 34 to shader processor 36.

The example techniques described in this disclosure may also be applicable to tree traversal algorithms. For example, in bounding volume hierarchy (BVH) tree traversal for ray tracing, texture unit 34 may be configured for the ray-box intersection test and to traverse the tree using many execution iterations of operations in a loop. For quad tree traversal (e.g., screen-space ray tracing, depth of field, volume rendering, view synthesis, etc.), a developer may build quad trees on top of depth buffers. To traverse the trees, texture unit 34 may be configured to execute loop operations in addition to ray-box intersection test and ray-plane intersection test. The ray-plane intersection test is a simplified ray-box intersection test.

Figure 4:
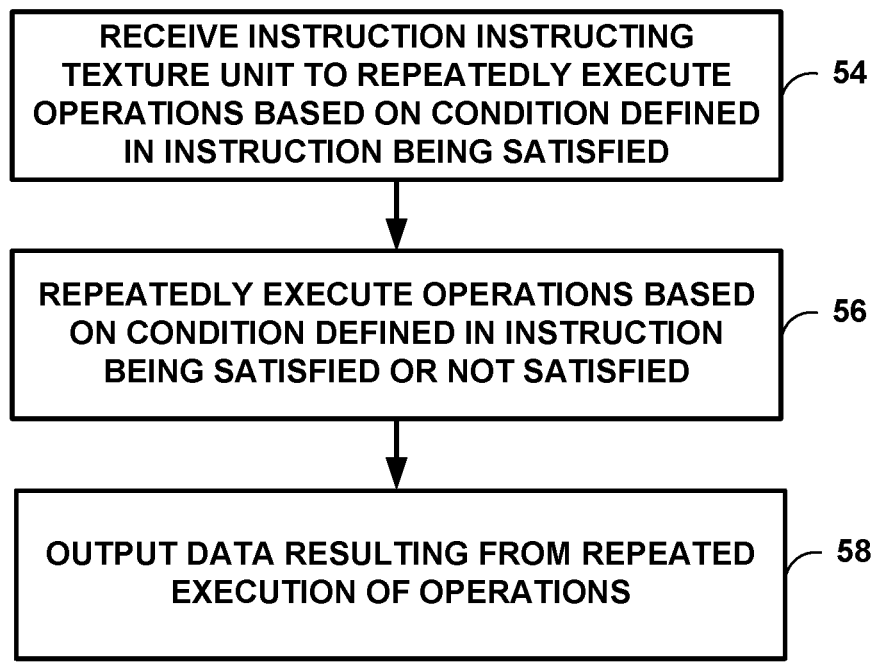
FIG. 4 is a flowchart illustrating an example method of processing data in accordance with one or more example techniques described in this disclosure.

FIG. 4 is a flowchart illustrating an example method of processing data in accordance with one or more example techniques described in this disclosure. Texture unit 34 receives an instruction from shader processor 36 of GPU 12 instructing texture unit 34 to repeatedly execute operations based on a condition defined in the instruction being satisfied (54). The operations may be operations of a shader program and operations to modify texture coordinates. Examples of the operations include POM, SSRT, DoF processing, volume rendering, or water or terrain rendering with dynamic height fields.

Texture unit 34 repeatedly executes the operations based on the condition defined in the instruction being satisfied or not satisfied (56). For example, texture unit 34 repeatedly executes operations until the condition is satisfied (e.g., repeatedly executes if the condition is not satisfied) or as long as the condition is satisfied (e.g., repeatedly executes if the condition is satisfied). Also, texture unit 34 executes operations based on the condition defined in the instruction being satisfied or satisfied without receiving any addition instructions to execute the operations.

Texture unit 34 outputs data resulting from the repeated execution of the operations to shader processor 36 (58). In one example, texture unit 34 outputs the data to shader processor 36 only after all iterations of the repeated execution of the operations are complete.

In some examples, output unit 50 of texture unit 34 may be configured to determine whether an iteration of execution of the operations is needed based on whether the condition defined in the instruction is satisfied or not satisfied. Output unit 50 may be configured to output from texture unit 34 feedback signal 52 to input unit 40 based on the determination that the iteration of execution of the operations is needed. Otherwise, output unit 50 may be configured to output the data resulting from the repeated execution of the operations based on the determination that the iteration of execution of the operations is not needed. In some examples, in determining whether to execute another iteration, output unit 50 may compare the read texel value or a value based on the texel value to a variable defined in the instruction.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Various aspects and examples have been described. However, modifications can be made to the structure or techniques of this disclosure without departing from the scope of the following claims.

What is claimed is:

1. A method of processing data, the method comprising:
receiving, by a texture unit of a graphics processing unit (GPU) and from a shader processor of the GPU, an instruction comprising a condition;
executing, by the texture unit and in response to receiving the instruction, operations comprising:
reading a first texel value based on the instruction;
determining to read a second texel value based on the first texel value and the condition, wherein the determining is without further input from the shader processor;
outputting a feedback signal to an input of the texture unit based on the determination to read the second texel value; and
reading the second texel value in response to the feedback signal; and
outputting, by the texture unit, data resulting from the execution of the operations.

2. The method of claim 1, wherein the first texel value comprises a plurality of texel values and the second texel value comprises a plurality of texel values.

3. The method of claim 1, wherein determining to read the second texel value comprises:
comparing a value based on the first texel value with a variable defined in the instruction;
determining whether the condition is satisfied or not satisfied based on the comparison; and
determining to read the second texel value based on the determination of whether the condition is satisfied or not satisfied.

4. The method of claim 1, wherein outputting the data comprises:
determining that the condition is satisfied; and
outputting the data resulting from the execution of the operations based on the determination that the condition is satisfied.

5. The method of claim 1, wherein the operations comprise operations of a shader program.

6. The method of claim 1, wherein the operations comprise operations to modify texture coordinates.

7. The method of claim 1, wherein the operations comprises operations for one or more of parallax occlusion mapping (POM), screen space ray tracing (SSRT), depth of field (DoF) processing, volume rendering, or water or terrain rendering with dynamic height fields.

8. A device for processing data, the device comprising:
a graphics processing unit (GPU) comprising a shader processor; and
a texture unit configured to:
receive, from the shader processor, an instruction comprising a condition;
execute, in response to receiving the instruction, operations, wherein execution of the operations cause the texture unit to:
read a first texel value based on the instruction;
determine to read a second texel value based on the first texel value and the condition, wherein the texture unit is configured to determine to read the second texel value without further input from the shader processor;
output a feedback signal to an input of the texture unit based on the determination to read the second texel value; and
read the second texel value in response to the feedback signal; and
output data resulting from the execution of the operations.

9. The device of claim 8, wherein the first texel value comprises a plurality of texel values and the second texel value comprises a plurality of texel values.

10. The device of claim 8, wherein to determine to read the second texel value, the texture unit is configured to:
compare a value based on the first texel value with a variable defined in the instruction;
determine whether the condition is satisfied or not satisfied based on the comparison; and
determine to read the second texel value based on the determination of whether the condition is satisfied or not satisfied.

11. The device of claim 8, wherein to output the data, the texture unit is configured to:
determine that the condition is satisfied; and
output the data resulting from the execution of the operations based on the determination that the condition is satisfied.

12. The device of claim 8, wherein the operations comprise operations of a shader program.

13. The device of claim 8, wherein the operations comprise operations to modify texture coordinates.

14. The device of claim 8, wherein the operations comprises operations for one or more of parallax occlusion mapping (POM), screen space ray tracing (SSRT), depth of field (DoF) processing, volume rendering, or water or terrain rendering with dynamic height fields.

15. The device of claim 8, wherein the device comprises one of:
an integrated circuit;
a microprocessor; or
a wireless communication device.

16. The device of claim 8, wherein the GPU comprises the texture unit.

17. A non-transitory computer-readable storage medium storing instructions that when executed cause one or more processors of a device for processing data to:

receive, from a shader processor of a graphics processing unit (GPU), an instruction comprising a condition;

execute, by a texture unit and in response to receiving the instruction, operations, wherein execution of the operations cause the one or more processors to:

read a first texel value based on the instruction;

determine to read a second texel value based on the first texel value and the condition, wherein the instructions that cause the one or more processors to determine to read the second texel cause the one or more processors to determine to read the second texel without further input from the shader processor;

output a feedback signal to an input of the texture unit based on the determination to read the second texel value; and read the second texel value in response to the feedback signal; and output data resulting from the execution of the operations.

18. The non-transitory computer-readable storage medium of claim 17, wherein the first texel value comprises a plurality of texel values and the second texel value comprises a plurality of texel values.

19. The non-transitory computer-readable storage medium of claim 17, wherein the instructions that cause the one or more processors to determine to read the second texel value comprise instructions that cause the one or more processors to:

compare a value based on the first texel value with a variable defined in the instruction;

determine whether the condition is satisfied or not satisfied based on the comparison; and determine to read the second texel value based on the determination of whether the condition is satisfied or not satisfied.

20. The non-transitory computer-readable storage medium of claim 17, wherein the instructions that cause the one or more processors to output the data comprise instructions that cause the one or more processors to:

determine that the condition is satisfied; and output the data resulting from the execution of the operations based on the determination that the condition is satisfied.

21. The non-transitory computer-readable storage medium of claim 17, wherein the operations comprise operations of a shader program.

22. The non-transitory computer-readable storage medium of claim 17, wherein the operations comprise operations to modify texture coordinates.

23. The non-transitory computer-readable storage medium of claim 17, wherein the operations comprises operations for one or more of parallax occlusion mapping (POM), screen space ray tracing (SSRT), depth of field (DoF) processing, volume rendering, or water or terrain rendering with dynamic height fields.

* * * * *